United States Patent Office 3,412,916
Patented Nov. 26, 1968

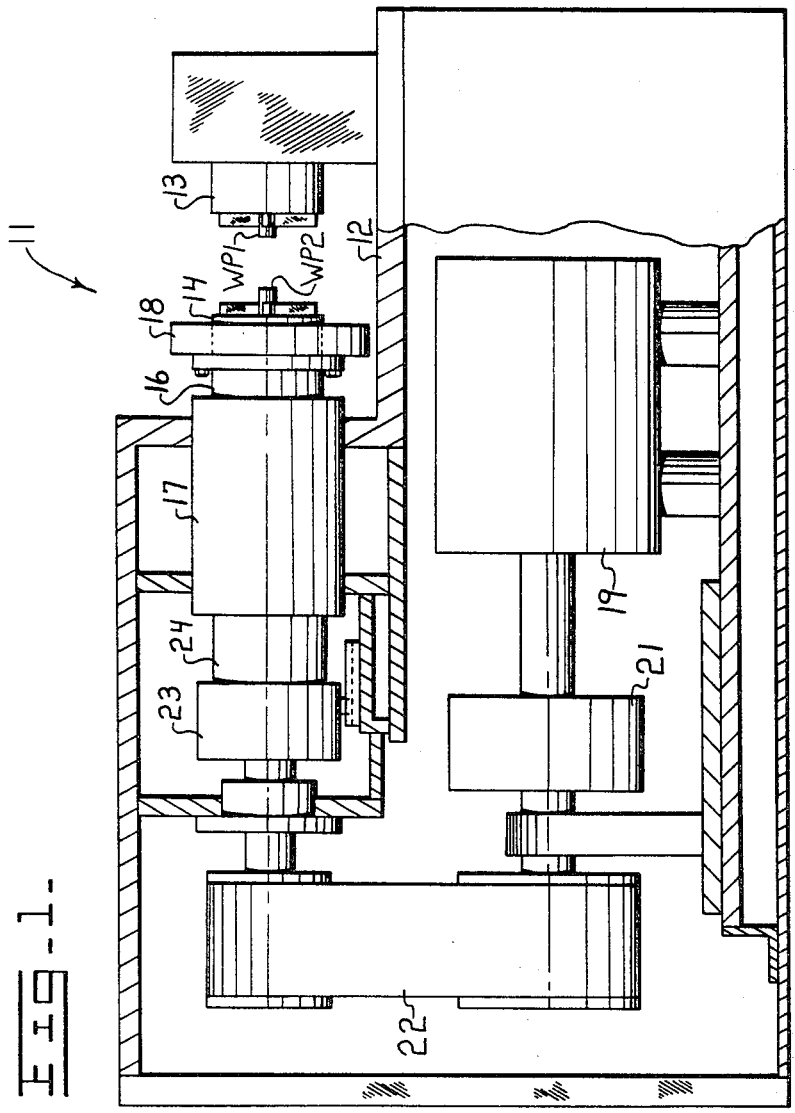

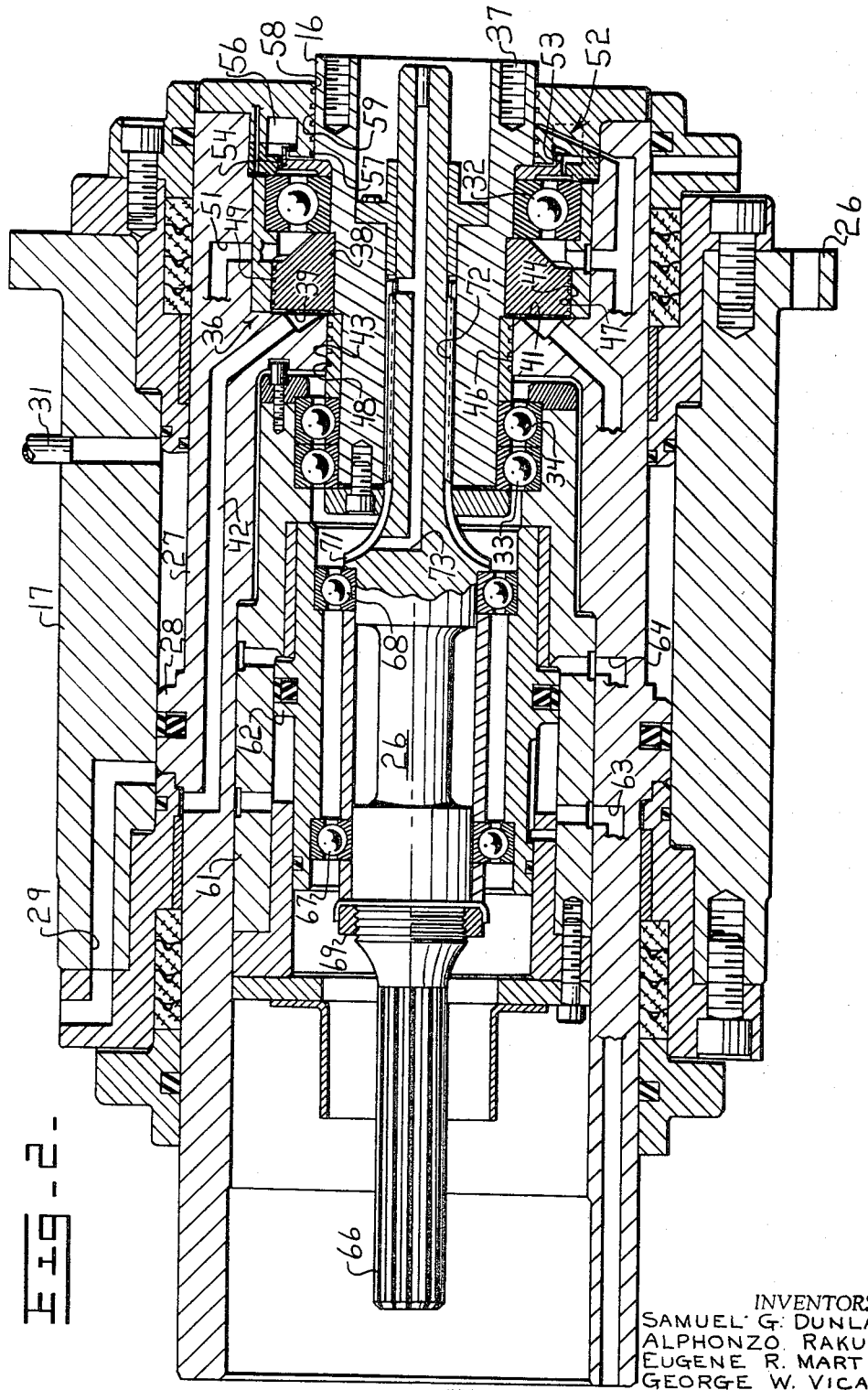
Fig-2-

3,412,916
COMBINED LOAD CYLINDER AND SPINDLE FOR
A WELDING MACHINE
Samuel G. Dunlap, Goodfield, Alphonzo Rakus, Peoria,
Eugene R. Martin, East Peoria, and George W. Vicary
and Ira H. Sage, Peoria, Ill., assignors to Caterpillar
Tractor Co., Peoria, Ill., a corporation of Illinois
Filed June 30, 1966, Ser. No. 561,829
5 Claims. (Cl. 228—2)

ABSTRACT OF THE DISCLOSURE

A combined load cylinder and spindle for a friction welding machine has a tubular member which is axially movable within an outer cylinder and includes a hydrostatic bearing between the spindle and the tubular member.

---

This invention relates to a welding machine of the kind in which two parts to be welded are pressed together in rubbing contact at a common interface to heat the interface to a plastic weldable condition. This invention relates particularly to a combined load cylinder and spindle for the welding machine.

The method of welding parts by pressing the parts together and rotating an end of one part against an end of the other part until the ends become plastic has been developed considerably during the eight to nine years following the publication of Russian articles describing the method. As a result, both the control of the process parameters (pressures, rotational speeds, duration of rubbing contact, amount of energy input) and the machines for performing the process have been improved and refined. To obtain high quality welds with most materials it is necessary that the machine be capable of operating within rather narrow limits of preselected values of process parameters.

Since the process requires high axial loads at high rotational speeds, large friction losses can be produced in the machine itself. Such internal friction losses can make it difficult to obtain the precise control of input energy to the weld that is necessary to produce the desired weld quality.

It is therefore a primary object of the present invention to reduce friction losses within the machine to a minimum. This is accomplished in the present invention by using low friction bearings for axial and radial support of the rotating components of the machine and also by arranging the machine components in a way to minimize the need for rotating seals.

The machine of the present invention uses inertial weights for storing all of the energy needed to weld the parts. Inertial weights having the desired mass and radius of gyration are mounted on a rotary spindle which carries one of the parts to be welded. The spindle is accelerated to a selected speed at which the desired amount of energy is stored in the inertial weights before the parts are engaged. The drive motor is then disconnected from the spindle, and a load cylinder and piston are actuated to shift the rotating spindle and engage the parts to be welded in rubbing contact with the desired pressure of engagement. The load piston is a tubular member, and the spindle is mounted for rotation within one end of the tubular member. The load cylinder and spindle are thus combined in one unit, and this is a specific object of the present invention.

The spindle includes a chuck for holding one of the parts. The chuck is power actuated to clamp and to unclamp the parts to be welded by a chucking cylinder and piston located internally of the tubular load piston. All of the operating parts for the rotary chuck are contained internally of the load cylinder to provide an axially compact arrangement which is a further specific object of the present invention.

The chucking piston is also tubular, and the drive shaft for the spindle passes through the interior of the chucking piston and is mounted for rotation within the chucking piston. The drive shaft for the spindle also serves as the draw bar for the rotary chuck. Since the chucking piston does not rotate with respect to either the load piston or the load cylinder, rotary seals are not required between these components. This simplifies the design and also eliminates internal friction losses which would be produced by rotary seals.

The machine of the present invention uses a hydrostatic bearing between the spindle and the tubular load piston to take the axial thrust developed on the spindle when the parts to be welded are engaged in rubbing contact. The hydrostatic bearing is a very efficient thrust bearing and insures that substantially the entire measured amount of energy stored in the inertial weights is transferred to the parts as weld heat.

The hydrostatic bearing also includes closely spaced cylindrical surfaces on the spindle and on the tubular load piston for permitting a controlled leakage of pressurized fluid from the chamber of the hydrostatic bearing. The pressurized fluid passing between the closely fitting cylindrical surfaces provides radial support for the spindle. A series of circumferentially extending grooves are formed in one of the surfaces to increase the effectiveness of the radial hydrostatic support.

The controlled leakage also acts as a dampening means for absorbing the shock of initial engagement between the parts to be welded and for dampening recurring pressure variations as a result of the initial shock.

A welding machine having these specific features effective to function in the manner described constitutes a further object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation view, partly broken away to show details of construction, of a welding machine constructed in accordance with one embodiment of the present invention; and FIG. 2 is a cross-section through a combined load cylinder and spindle of the machine shown in FIG. 1.

In FIG. 1 a welding machine constructed in accordance with one embodiment of the present invention is indicated generally by the reference numeral 11.

The machine 11 includes a frame 12, a stationary, nonrotatable chuck 13 and a rotatable and axially moveable chuck 14. One part WP1 to be welded is clamped in the jaws of the chuck 13 and the other part WP2 is clamped in the jaws of the chuck 14.

The chuck 14 is mounted on a spindle 16 which is mounted for rotation in one end of a load cylinder 17 in a manner which will be described in detail below with reference to FIG. 2.

One or more inertial weights 18 are also mounted on the spindle 16. The energy required to weld the parts WP1 and WP2 is stored in the inertial weights 18 by rotating the spindle and weights to a predetermined speed before the load cylinder is actuated to press the parts into engagement.

A motor 19 is used to accelerate the spindle 16 and the weights 18 to the desired rotational speed, and is then disconnected from the spindle before the parts are engaged in rubbing contact. The drive from the motor 19 to the spindle 16 includes a hydraulic coupling 21, which is effective to absorb slip during rapid acceleration, a belt drive 22, a hydraulic clutch 23, and a planetary transmission 24. The clutch 23 is used to disconnect the motor from the spindle, and the output of the planetary transmission 24 is spline connected to drive shaft 26 (see FIG. 2) which extends internally through the load cylinder 17 to a second splined connection to the spindle 16.

With continued reference to FIG. 2, the load cylinder 17 includes a flange 26 for mounting the load cylinder on the machine frame.

A tubular member 27 having an outwardly extending annular piston 28 is mounted for axial movement within the load cylinder 17. A conduit 29 conducts pressurized fluid to one face of the piston 28 to slide the piston and spindle forward and to engage the parts to be welded with the desired force. A conduit 31 conducts pressurized hydraulic fluid to the other face of the piston to return the piston to the position shown in FIG. 2.

The spindle 16 is mounted for rotation in one end of the tubular member 27 by ball bearings 32, 33 and 34 and by a hydrostatic bearing indicated generally by the reference numeral 36.

The spindle 16 is shown in FIG. 2 without the chuck 14. The chuck 14 is attached to the spindle by cap screws which thread into tapped openings 37.

The hydrostatic bearing 36 includes a ring 38 attached to and rotatable with the spindle 16. A radially extending surface 39 of the ring 38 is slightly spaced from a corresponding radially extending surface 41 of the tubular member 27 and pressurized hydraulic fluid is supplied to the hydraulic chamber thus defined by a conduit 42 which interconnects with the conduit 29 and the associated hydraulic chamber of the load piston 28. In the construction shown in FIG. 2 the effective thrust area of the face 39 is equal to the effective thrust area of the load piston 28. Since the pressure acting on both surfaces is the same, the hydrostatic thrust bearing counterbalances the load piston 28.

The interconnection of the chamber of the hydrostatic bearing with the chamber of the load piston serves another purpose. It increases the volume of oil available for absorbing the shock of initial engagement of the parts WP1 and WP2. That is, the interconnection increases the amount of oil which is available for slight hydraulic compression over that which would be available if the hydrostatic bearing were supplied directly from a pump.

The hydrostatic bearing 36 also includes cylindrical surfaces on the spindle (43 and 44) which are slightly spaced from opposed cylindrical surfaces on the tubular member (46 and 47) to permit a controlled leakage of pressurized fluid from the chamber of the hydrostatic bearing 36. The cylindrical surfaces 43 and 44 on the spindle are also formed with a series of circumferentially extending capillary grooves 48 and 49. The close fit of the cylindrical surfaces and the location of the grooves are effective to provide radial support from the pressurized fluid passing between the cylindrical surfaces. The closely fitting cylindrical surfaces and the capillary grooves also act as dampening means for minimizing recurring pressure variations in the load chamber of the load piston 17. This mode of operation is important since any substantial fluctuations of pressure during the weld cycle can have a detrimental effect on weld quality.

Some of the fluid which passes between the surfaces 44 and 47 is supplied to the bearing 32 to provide lubricant for the bearing. The remainder of the fluid is returned to the reservoir by a conduit 51.

A labyrinth seal, indicated generally by the reference numeral 52, is located outboard of the bearing 32. The labyrinth seal 52 includes closely spaced and relatively rotatable cylindrical surfaces 53 on the spindle and 54 on the tubular member 27, a chamber 56 and capillary grooves 57 in a cylindrical surface 58 on the tubular member which is slightly spaced from an opposed cylindrical surface 59 on the spindle. The close fit of the coacting cylindrical surfaces of the labyrinth seal 52 and the action of the capillary grooves 57 produce an effective seal and also act to some extent to meter the quantity of oil which can flow out of the hydraulic chamber of the hydrostatic bearing 36.

The pressurized fluid passing between the cylindrical surfaces 43 and 46 is delivered to the bearings 33 and 34 to serve as lubricant for those bearings.

A chucking cylinder 61 and a tubular chucking piston 62 are also mounted internally of the tubular member 27 behind the spindle 16. Pressurized hydraulic fluid for actuating the chucking piston 62 is supplied through conduit 63 and 64.

The drive shaft 26, which as noted above is connected by splines 66 in sliding fit relation with the output member of the planetary transmission 24, is mounted for rotation within the tubular chucking piston 62 by ball-bearings 67 and 68. A nut 69 and a flange 71 connect the drive shaft 26 for axial movement with the chucking piston 62. The drive shaft 26 is connected by splines 72 to the spindle 16 and lubricant is supplied to the splines by a conduit 73 so that the drive shaft 26 is freely shiftable in an axial direction within the spindle 16. The right-hand end of the drive shaft 26, as viewed in FIG. 2, is connected (by means not shown in FIG. 2) to the actuating mechanism for the chuck 14 so that the drive shaft 26 serves as the drawbar for the chuck.

Both the load piston 28 and the chucking piston 62 are kept from rotating by a key and slot arrangement. Since the chucking piston 62 does not need to rotate with respect to the load piston 28 there is no need for any rotating seals between these two components. Thus, the mounting of the drive shaft for rotation within the tubular chucking piston simplifies sealing problems and eliminates a potential source of friction losses.

The combined load cylinder and spindle construction shown in FIG. 2 is axially compact because all the rotating components are mounted within the load cylinder. It is also quite efficient. As a result, substantially the entire amount of energy stored in the inertial weights 18 can be delivered to the workpieces WP1 and WP2 as weld heat with only negligible losses due to internal friction. This in turn greatly increases the precision with which the process can be performed and enables parts to be produced with uniformly high quality.

It is believed that the operation of the combined load cylinder and spindle will be apparent from the above description. However, one cycle of operation will be briefly reviewed. After new parts to be welded have been clamped in the chucks the clutch 23 is engaged and the motor 19 accelerates the spindle to a preselected speed. The clutch 23 is then disengaged, and with the spindle 16 and inertial weights 18 rotating freely at the desired speed, pressure is supplied to the conduit 29 to move the load piston 28 (to the right as viewed in FIG. 2) to engage the parts with the desired load. After the parts have been engaged in rubbing contact and the stored energy of the inertial weights 18 has been expended as the weld is completed, pressurized fluid is supplied to the conduit 63 to shift the drive shaft 26 (which at that time is not rotating) in a direction to unclamp the jaws of the chuck 14. The welded parts can then be removed from the welding machine, new parts inserted in the chucks and a new cycle of operation started.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A combined load cylinder and spindle for a welding machine of the kind in which two parts to be welded are pressed together in rubbing contact at a common interface to heat the interface to a plastic weldable condition, said load cylinder and spindle comprising, a cylinder attached to the machine frame, a tubular member having an outwardly extending annular piston and mounted for axial movement within the cylinder, a spindle at one end of the tubular member and mounting a chuck for holding one of the parts to be welded, and bearing means mounting one end of the spindle for rotation within the tubular member and including a hydrostatic bearing between the spindle and the tubular member for taking the axial thrust developed on the spindle when the parts to be welded are engaged in rubbing contact.

2. A combined load cylinder and spindle for a welding machine of the kind in which two parts to be welded are pressed together in rubbing contact at a common interface to heat the interface to a plastic weldable condition, said load cylinder and spindle comprising, a cylinder attached to the machine frame, a tubular member having an outwardly extending annular piston and mounted for axial movement within the cylinder, a spindle at one end of the tubular member and mounting a chuck for holding one of the parts to be welded, bearing means mounting one end of the spindle for rotation within the tubular member, a drawbar attached to the chuck, and a fluid actuated chucking cylinder and piston mounted within the tubular member for actuating the drawbar to clamp and unclamp the chuck.

3. A combined load cylinder and spindle as defined in claim 1 wherein the hydrostatic bearing includes closely spaced cylindrical surfaces on the spindle and tubular member and a plurality of circumferentially extending capillary grooves in one of the cylindrical surfaces effective to provide radial support from pressurized fluid leaking from the hydrostatic bearing and passing between the closely spaced cylindrical surfaces.

4. A combined load cylinder and spindle as defined in claim 3 wherein the hydrostatic bearing includes a hydraulic chamber interconnected with a hydraulic chamber of the load cylinder to increase the volume of hydraulic fluid available for absorbing shock produced by initial engagement of the parts to be welded and wherein the closely fitting cylindrical surfaces and capillary grooves act as dampening means for minimizing recurring pressure variations in the hydraulic chambers of the hydrostatic bearing and load cylinder.

5. A combined load cylinder and spindle as defined in claim 2 including a drive shaft mounted for rotation within the interior of the chucking piston and having a splined connection to the spindle at one end for permitting relative movement in an axial direction between the drive shaft and the spindle and having a splined connection to other drive elements at the opposite end for permitting relative movement in an axial direction between the drive shaft and the other drive elements so that the drive shaft can be directly connected to the chuck to act as the drawbar for the chuck and rotating seals are not required for the supply of hydraulic fluid from the tubular member to the chucking piston.

References Cited

UNITED STATES PATENTS

| | | | |
|---|---|---|---|
| 3,349,982 | 10/1967 | Lipp | 228—2 |
| 3,269,002 | 8/1966 | Hollander | 228—2 |

RICHARD H. EANES, JR., *Primary Examiner.*